US008667578B2

(12) United States Patent
Ladki et al.

(10) Patent No.: US 8,667,578 B2
(45) Date of Patent: Mar. 4, 2014

(54) WEB MANAGEMENT AUTHORIZATION AND DELEGATION FRAMEWORK

(75) Inventors: Saad A. Ladki, Bellevue, WA (US); Madhur Joshi, Kirkland, WA (US); Robert J. Lucero, Seattle, WA (US); Carlos Aguilar Mares, Snoqualmie, WA (US); Nitasha Verma, Kirkland, WA (US); Bilal Alam, Sammamish, WA (US); Clea H. Allington, Bellevue, WA (US); Vijay Sen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

(21) Appl. No.: 12/354,790

(22) Filed: Jan. 16, 2009

(65) Prior Publication Data

US 2010/0186082 A1 Jul. 22, 2010

(51) Int. Cl.
*H04L 29/06* (2006.01)

(52) U.S. Cl.
USPC .............................................. 726/19; 726/18

(58) Field of Classification Search
USPC ..................................................... 726/18, 19
See application file for complete search history.

(56) References Cited

U.S. PATENT DOCUMENTS

| 7,293,070 | B2 | 11/2007 | Moses et al. | |
|---|---|---|---|---|
| 7,412,720 | B1 * | 8/2008 | Frey et al. | 726/8 |
| 7,653,934 | B1 * | 1/2010 | Joshi | 726/6 |
| 2002/0083014 | A1 * | 6/2002 | Brickell et al. | 705/76 |
| 2003/0233544 | A1 * | 12/2003 | Erlingsson | 713/167 |
| 2005/0050354 | A1 * | 3/2005 | Gociman | 713/201 |
| 2006/0048131 | A1 | 3/2006 | Napier et al. | |
| 2007/0180491 | A1 | 8/2007 | Mevissen et al. | |
| 2007/0186102 | A1 * | 8/2007 | Ng | 713/165 |
| 2008/0022368 | A1 | 1/2008 | Field et al. | |
| 2008/0263138 | A1 * | 10/2008 | Heslep et al. | 709/203 |
| 2009/0106780 | A1 * | 4/2009 | Nord et al. | 719/329 |

OTHER PUBLICATIONS

Hwang, et al., "A Safe Delegation Method for Web Services in Pervasive Computing Environments", retrieved at <<http://paper.ijcsns.org/07_book/200701/200701B20.pdf>> Jan. 2007, IJCSNS International Journal of Computer Science and Network Security, vol. 7 No. 1, pp. 348-355.

Gomi, Hidehito, "A Delegation Framework for Federated Identity Management", retrieved at http://www2.pflab.ecl.ntt.co.jp/dim/slide12.pdf>> Nov. 11, 2005, ACM CCS 2005 Workshop on DIM (Digital Identity Management), pp. 1-26.

"An Overview of Feature Delegation in IIS 7.0", retrieved at <<http://learn.iis.net/page.aspx/155/an-overview-of-feature-delegation-in-iis-70/rev/6>> Jan. 31, 2008, 8 Pages.

* cited by examiner

*Primary Examiner* — Michael Pyzocha
(74) *Attorney, Agent, or Firm* — Ben Tabor; Kate Drakos; Micky Minhas

(57) ABSTRACT

Described is a technology in which a non-administrator computer/web user is allowed to perform an administrative-level task within a certain context and/or scope. An authorization store is queried based on information (e.g., a provider, a username, and a path) provided with an authorization request, e.g., from an application via an API. The information in the authorization store, set up by an administrator, determines the administrative action is allowed. If so, a credential store provides credentials that allow the action to be runs before reverting the user to the prior set of credentials. Also described is a pluggable provider model through which the authorization store and/or delegation store are accessed, whereby the data maintained therein can be any format and/or at any location known to the associated provider.

19 Claims, 4 Drawing Sheets

WEB MANAGEMENT AUTHORIZATION AND DELEGATION FRAMEWORK

BACKGROUND

In the past, most web sites contained relatively simple content such as HTML and picture files. Currently, web sites have evolved to host large applications that often include artifacts such as certificates and databases.

The contemporary management model (e.g., in Windows®) only allows administrators to deploy certificates and databases to web servers. However, in shared web hosting environments, the user is typically not an administrator, and thus does not have the ability to deploy and manage large web sites onto the shared hosting servers. This frustrates administrators and non-administrator users, as users have to call web hosting specialists in order to deploy new databases or make changes to existing ones, which increases the overall cost of ownership both of a web site and a web server.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a non-administrator user is allowed to perform an administrative-level task within a certain context and/or scope. Upon receiving a request to authorize a non-administrative user to perform an administrative action, such as from an application API call, an authorization store is queried based on information (e.g., a provider, a username, and a path) provided with the request. The information in the authorization store, set up by an administrator, is used to determine whether the non-administrative user is allowed to perform the administrative action. If so, request handler (e.g., a rule engine) obtains credentials that allow the non-administrative user to perform the administrative action, runs the administrative action, and returns the user to the prior set of credentials.

In one aspect, the credentials are maintained in a delegation store. A pluggable provider model is also described, through which the authorization store and/or delegation store are accessed, whereby the data maintained therein can be any format and/or at any location known to the associated provider.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a management model in which administrative tasks may be delegated to non-administrators in a controlled manner. To this end, there is provided an abstract and extensible authorization store that lists the users that are allowed to perform an administrative task. Also provided is a delegation store that contains the credentials that are impersonated when a non-administrator is performing an administrative task.

While Microsoft® Windows® is used as an example of an underlying administrator/user management model with respect to permissions, it should be understood that any of the examples described herein are non-limiting examples. For example, although the technology is part of Microsoft Corporation's web deployment tool, it may be used in any system that needs to grant administrative privileges to non-administrators in a controlled manner. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and network management in general.

Figure 1:
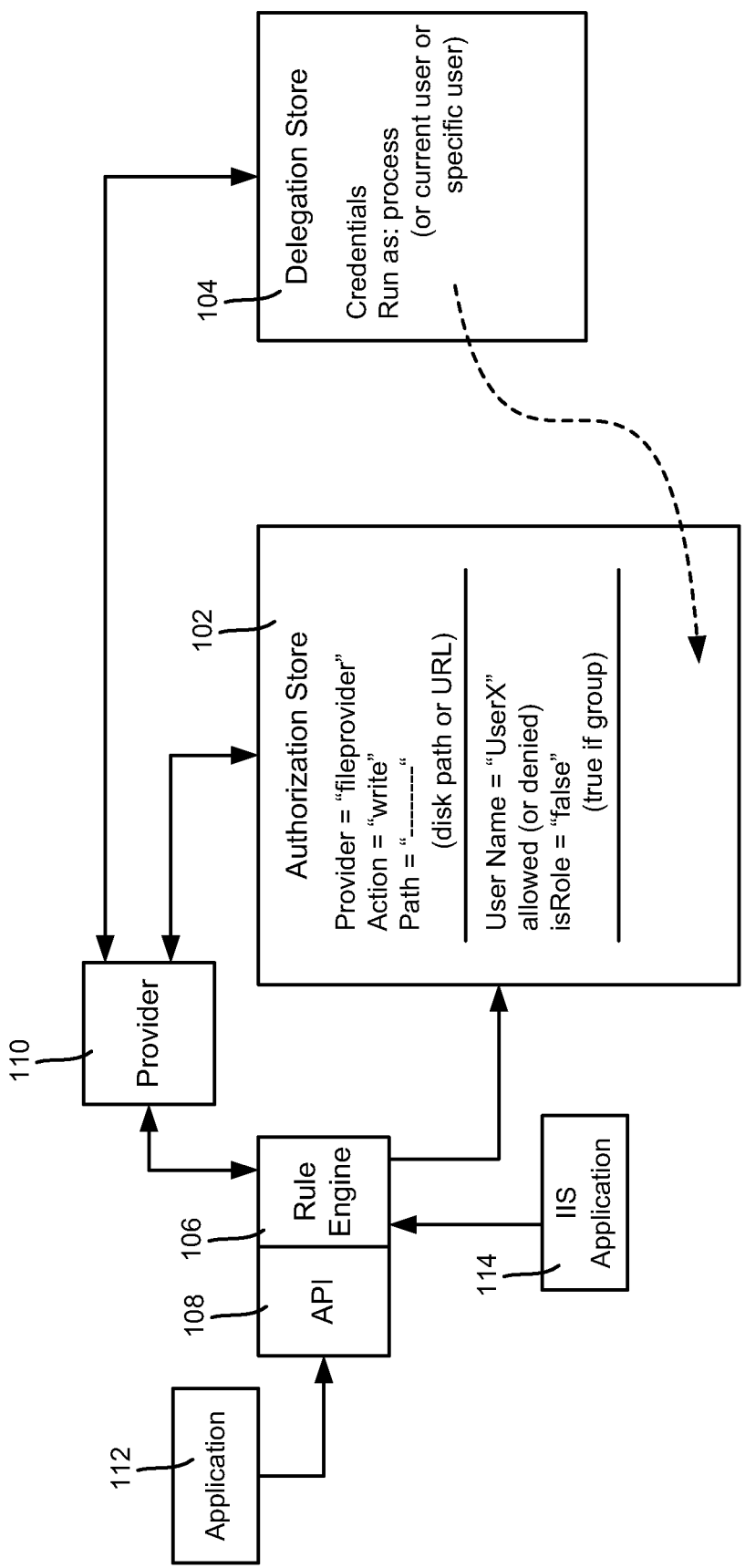
FIG. 1 is a block diagram showing example components of a framework for authorizing computer users to perform administrative tasks via delegated credentials.

FIG. 1 shows various aspects related to a system that uses an authorization store 102 and delegation store 104, which contain data (e.g., permissions and credentials) that allow non-administrators to perform administrative tasks using impersonation. FIG. 1 also shows a rule engine 106 (described below) and an API 108 that allows applications to hook into this system. In general, the rule engine 106 contains the logic that decides whether a user is allowed or denied with respect to a task, and if allowed, handles impersonation via credentials from the delegation store.

In one implementation, a pluggable provider model is used, as represented by the provider 110. In general, the rule engine 106 finds the information in the authorization store 102 and delegation store 104 via the provider 110. As can be appreciated, because a pluggable provider returns the information, this facilitates the storage of the authorization store 102 and delegation store 104 in different locations and/or formats (e.g., on disk, in a database, as XML, and so forth), and also does not limit users to those having Windows® user or group names. There are multiple providers, such as one for files, one for databases, one for registries, and so forth.

In general, when an application 112 determines that a non-administrator is attempting to perform an administrative task, the application 112 (e.g., via the API 108, rule engine 106 and provider 110) queries the authorization store 102 to see if this user is authorized to perform the operation. Note that in one implementation, a Microsoft® IIS (Internet Information Services) application 114 may communicate with rule engine 106 without going through the API 108.

In general and as described below with reference to FIGS. 2 and 3, if the user is allowed, the application proceeds; once a user is authorized, the application calls a delegation API that elevates the user context to perform the administrative tasks, using the credentials stored in the delegation store. The user context is then restored.

By way of example, consider a web user that wants to make changes to a web site with which the user runs, such as to create an application under the user's site, which requires changing settings in a file. The administrator cannot give access to the file, because the user may modify other users' settings. With the technology described herein, the administrator can set up the authorization and delegation system to give the user access to certain parts of the file, namely those that are within the user's scope, but not others. By adding a rule to the authorization store that grants access to a file provider for the user, the server administrator can allow a user (UserX) to publish content to the server via a specified path, such as C:\WebContent\UserX\, (but not other paths) for this user. Similarly, the administrator can allow a user to publish content including registry keys and values under a specific registry path via a grant rule added for the registry provider under path HKLM\UserX\. When the user attempts an action with respect to such a path, the authorization store allows it, whereby credentials are retrieved from the delegation store to perform the action. Note that in addition to file system paths, an authorization scope may be defined that authorizes a user based on a regular expression, a database connection string, and so forth.

To this end, as generally exemplified in FIG. 1, the authorization store is given a provider (e.g., a file provider), an action (e.g., write or read file files, add, delete or update for databases and so on), and a path. For a file provider, the path is to a file folder, for a registry provider, to a registry path, and so forth.

As also exemplified in FIG. 1, the username is added, along with whether the user is allowed or denied. The username may refer to a user (isRole is false) or to a group (isRole is true). Multiple usernames may be listed. Also, as described below with reference to FIG. 3, ordered processing is performed to handle conflicts, e.g., a user may be part of a group that is denied, but is specifically allowed as a user; by processing the user identity before the group identity, the user is allowed to perform the task.

The delegation store 104 (which in one implementation may be merged with the authorization store as indicated by the dashed curved arrow) contains credentials that allow the impersonation of an administrator; the credentials may be securely stored using any suitable encryption mechanism. In addition, the credentials may be specified for running as a process, the current user, or a specific user. For example, one rule for read access to the C:\folder may specify running as the current user, another rule for read access to the C:\ABC\ folder may specify running as a process, another rule for read access to the C:\123\ folder may specify running as a specific user, and so on. The specific user allows an administrator to define a new user (e.g., username=TempAdmin) for purposes of the impersonation.

Note that the above examples still potentially need a lot of administrator input if there are a lot of users. To make it easier for the administrator, a userscope variable may be specified that infers information already known about the user. For example, when a user logs into the user's site via a web management service, information about that user is known. By specifying the path with this variable, that is, path={userscope}, the appropriate path is automatically substituted for each user from the prior login, whereby the administrator need not add a path rule for each individual user.

Once set up for a user Z, the following simple code may be used in the application to attempt to elevate the user Z, where IsAuthorized is the called API and returns a delegation context if the user is authorized:

```
if (IsAuthorized
    delegation ctx.impersonate
    run as iisadmin
    ~~~~ /code that is run at elevated privileges
    delegation ctx.dispose
    run as Z)
~~~~ /code that is run at Z's privileges
```

Figure 2:
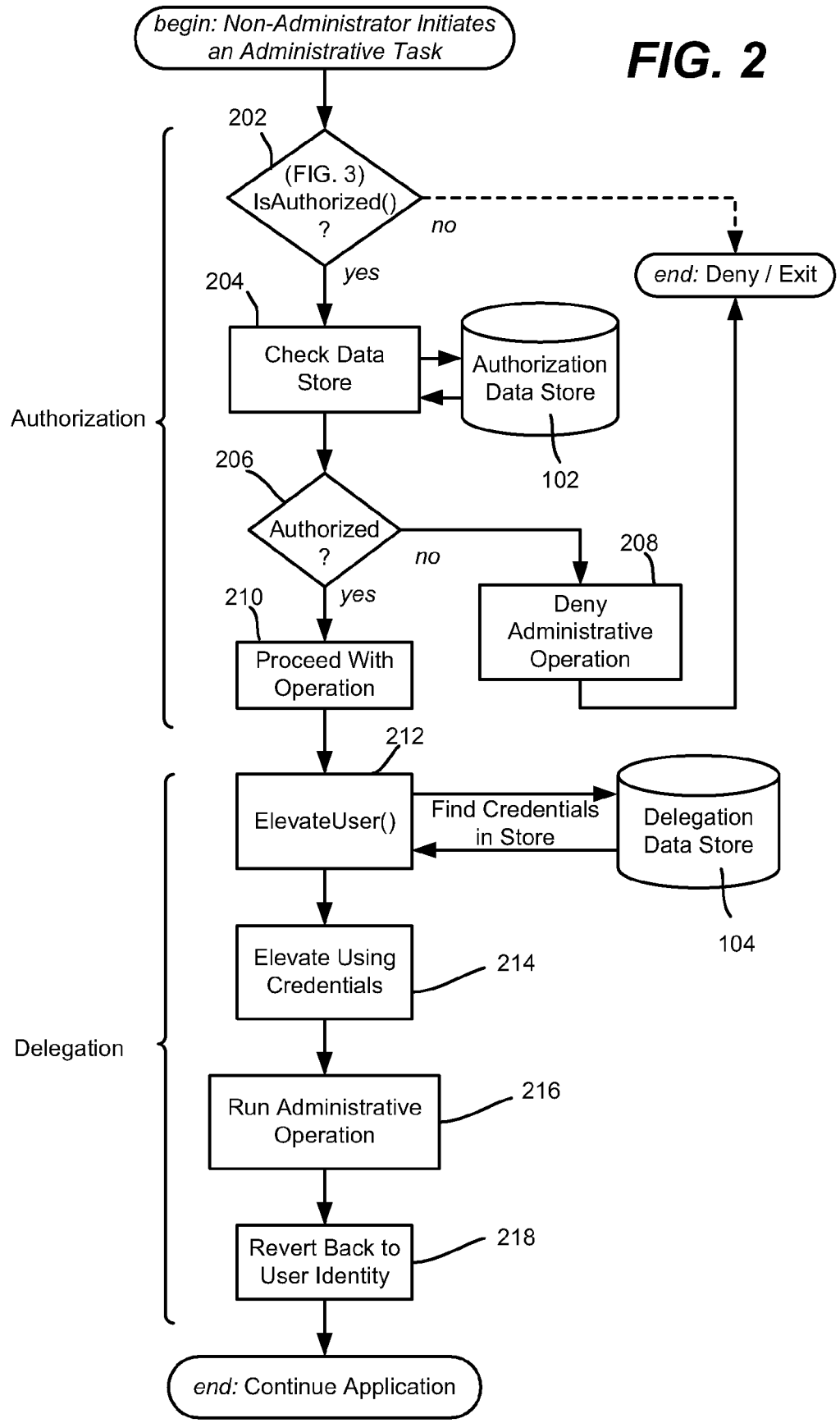
FIG. 2 is a flow diagram showing example steps taken in authorizing a computer user to perform an administrative task via delegated credentials.

FIG. 2 is a flow diagram showing example steps as to how the system works when a non-administrator attempts an administrative task. At step 202, the IsAuthorized function (of the API) is called to determine whether the user is allowed (as set up by an administrator) to impersonate an administrator for purposes of performing the particular task, as described below with reference to FIG. 3. If not, the user is denied the ability to perform the task, and the process ends.

If authorized, the authorization data store is checked at step 204 to determine whether the user is authorized for the specific task. If not, the user is denied via step 208, otherwise the operation proceeds via step 210.

To elevate the user, the credentials are obtained via step 212, and applied to the user (or the current user process) at step 214. The operation is then run at step 216, after which the application reverts the user back to the non-elevated user identity at step 218.

Figure 3:
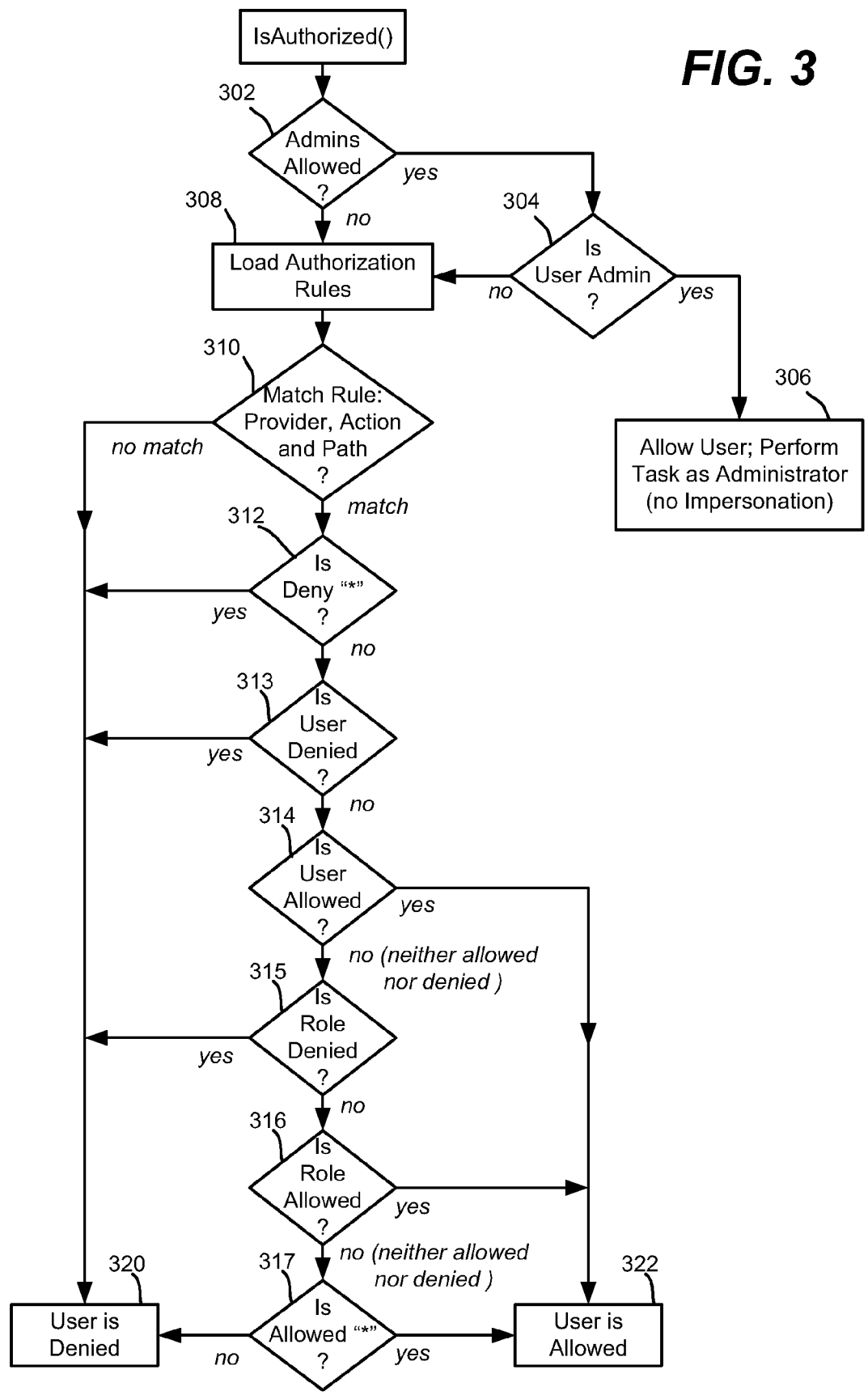
FIG. 3 is a flow diagram showing example steps taken in response to an API call to determine whether a user is allowed or denied receiving elevated privileges for a specified action.

FIG. 3 shows how the authorization API determines determine if a user is authorized for a particular task (after the user has been authenticated and authorized at the connection level). Step 302 checks a variable that determines whether administrators may bypass the authorization rules. If so and the user is an administrator at step 304, step 306 allows the administrator to perform the task directly.

If the variable does not allow bypassing (step 302) or the user is not an administrator (step 304), the authorization rules are loaded as represented via step 308, e.g., including the provider, action and path data. Via step 310 this is evaluated against the requested action, which fails (step 320) if it does not match.

Steps 312-317 are ordered ways to process the user and/or role data to determine if the requesting user is allowed. Step 312 checks whether all users ("*") are denied this particular action for this path, which fails the request if so by branching to step 320. If not, step 313 checks whether this user is denied, which fails the request if denied by branching to step 320

If not, step 314 evaluates whether this user is specifically allowed, branching to step 322 if so.

If there is no user-specific allow or deny information, role evaluation (e.g., corresponding to a group) is considered via steps 315 and 316. If the role is denied, the user is denied, and if allowed, the user is allowed. If there is no user-specific or role specific information, the user is denied unless all users are specifically allowed, as evaluated by step 317.

Exemplary Operating Environment

Figure 4:
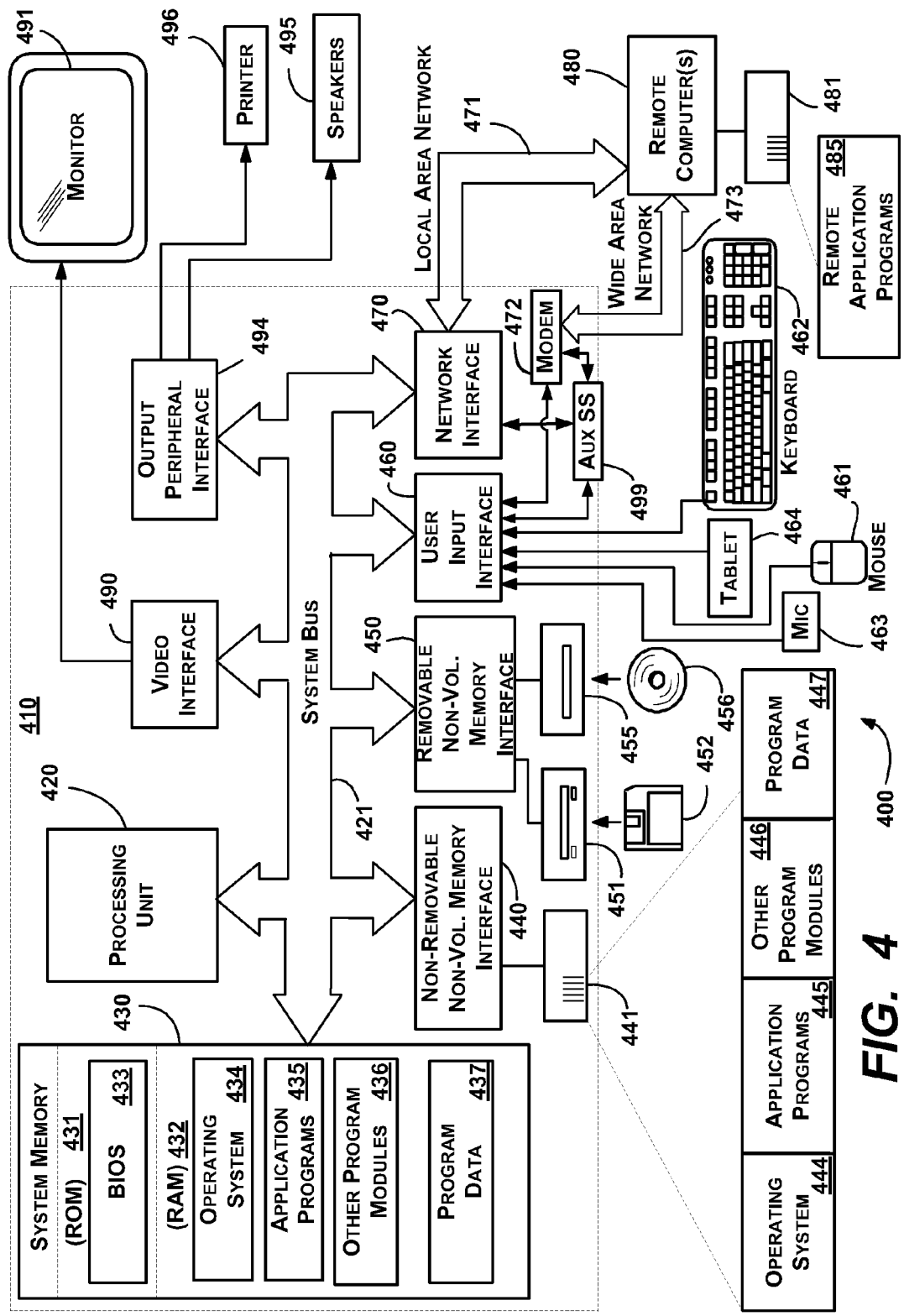
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
   receiving a request to authorize a non-administrative user to perform an administrative action;
   accessing an authorization store, which is configured with information that corresponds to users and specified actions associated with those users, for determining whether the non-administrative user is allowed to perform the administrative action, wherein the authorization store provides a userscope variable that specifies a path for the non-administrative user, and wherein the path specified is automatically substituted for the non-administrative user based on a user login of the non-administrative user;
   in response to a determination that the non-administrative user is allowed to perform the administrative action, providing credentials that allow the non-administrative user to perform the administrative action using impersonation, wherein the credentials are specified for at least one of running the action as a process, running the action as a current user, or running the action as a specific user;
   running the administrative action; and
   upon completion of the administrative action, returning the non-administrative user to a set of credentials that were associated with that non-administrative user prior to running the administrative action.

2. The method of claim 1 wherein providing the credentials comprises accessing a delegation store.

3. The method of claim 1 wherein the authorization store provides a userscope variable that infers information already known about a user from a user login.

4. The method of claim 1 wherein accessing the authorization store comprises communicating through a provider associated with that authorization store.

5. The method of claim 4 wherein the request identifies the provider, a username, and a path.

6. The method of claim 4 wherein receiving the request comprises handling an API call.

7. The method of claim 1 wherein determining whether the non-administrative user is allowed to perform the administrative action comprises:
   evaluating whether all users are denied;
   in response to a determination that all users are not denied, evaluating whether the non-administrative user is denied;
   in response to a determination that the non-administrative user is not denied, evaluating whether the non-administrative user is allowed;
   in response to a determination that the non-administrative user is not allowed, evaluating whether a role associated with the non-administrative user is denied;
   in response to a determination that the role associated with the non-administrative user is not denied, evaluating whether the role associated with the non-administrative user is allowed;
   in response to a determination that the role associated with the non-administrative user is not allowed, evaluating whether all users are allowed.

8. The method of claim 1 further comprising:
   defining an authorization scope for authorizing the user based on a regular expression, a database connection string or a file system path.

9. In a computing environment, a system comprising:
   a rules engine configured to receive a request to authorize a non-administrative user to perform an administrative action;
   an authorization store stored in memory coupled to the rules engine and configured to provide information that corresponds to users and specified actions associated with those users, the information including a userscope variable that specifies a path for the non-administrative user, the rules engine configured to automatically substitute the path specified for the non-administrative user based on a user login of the non-administrative user, the rules engine configured to determine whether the non-administrative user is allowed to perform the administrative action, and in response to a determination that the non-administrative user is allowed to perform the administrative action, the rules engine configured to obtain credentials from a credential store to enable the non-administrative user to perform the administrative action, wherein the credentials are specified for at least one of running the action as a process, running the action as a current user, or running the action as a specific user.

10. The system of claim 9 wherein the rule engine is coupled to the authorization store and the delegation store via a provider.

11. The system of claim 9 wherein the provider comprises a pluggable provider that is associated with the authorization and delegation stores.

12. The system of claim 9 wherein the delegation store provides credentials for running the action as a process, running the action as a current user, or running the action as a specific user.

13. The system of claim 9 wherein rule engine receives the request from an application via an API call.

14. The system of claim 9 further comprising an internet information service, wherein at least some user-related information is identified based upon a prior login to the internet information service.

15. The system of claim 9 wherein the credential store securely stores credentials using encryption.

16. One or more computer-readable storage devices storing computer-executable instructions, which in response to execution by a computer, cause the computer to perform steps, comprising:
   receiving a request to authorize a non-administrative user to perform an administrative action, the request including a provider, a username, and a path;
   using the provider to access an authorization store;
   determining from information in the authorization store and from the request whether the non-administrative user is allowed to perform the administrative action, including identifying a userscope variable that specifies a path for the non-administrative user and automatically substituting the path specified for the non-administrative user based on a user login of the non-administrative user;
   in response to a determination that the non-administrative user is allowed to perform the administrative action, obtaining credentials that allow the non-administrative user to perform the administrative action, wherein the credentials are specified for at least one of running the action as a process, running the action as a current user, or running the action as a specific user;
   running the administrative action; and
   returning the non-administrative user to a set of credentials that were associated with that non-administrative user prior to running the administrative action.

17. The one or more computer-readable storage devices of claim 16 wherein obtaining the credentials comprises accessing a delegation store that provides the credentials.

18. The one or more computer-readable storage devices of claim 16 wherein receiving the request comprises handling an API call.

19. The one or more computer-readable storage devices of claim 16 wherein determining whether the non-administrative user is allowed to perform the administrative action comprises matching provider, action and path information.

* * * * *